ND, 4000,

United States Patent Office 3,426,271
Patented Feb. 4, 1969

3,426,271
DISPLACEMENT MEASURING SYSTEM WITH HIGH FREQUENCY SOURCE AND LOW FREQUENCY OUTPUT TERMINAL CONNECTED BY COAXIAL CABLE TO MEASUREMENT AND DETECTION CIRCUIT
Pierre Alais, 148 Rue Boucicaut, Fontenay-aux-Roses, Hauts-de-Seine, France
Filed Aug. 6, 1965, Ser. No. 477,907
Claims priority, application France, Aug. 14, 1964, 985,218; Nov. 23, 1964, 995,929
U.S. Cl. 324—61        5 Claims
Int. Cl. G01r 27/26; G08c 19/10

ABSTRACT OF THE DISCLOSURE

Apparatus for measuring rectilinear and angular displacements and vibrations includes a pick-up unit and a supply and information unit interconnected by a single coaxial cable which may be any desired length. The pick-up unit includes condenser means providing an output signal in accordance with the direction and magnitude of a displacement, and a supply and information unit includes a source of high frequency potential and an information output terminal. Separating filter means are provided whereby the coaxial cable may simultaneously transmit high frequency potential to the pick-up unit and signal potential to the information terminal.

In a modification, a well stabilized reference voltage source is included in the supply and information unit and connected by a second coaxial cable to the pick-up unit and to diode chopping means in the latter.

Cross reference to related applications

The present invention relates to an improvement in the measuring means described in United States patent application Ser. No. 629,332, filed Apr. 7, 1967, which is a "Streamlined" continuation of application Ser. No. 307,999 filed on Sept. 10, 1963 and now abandoned.

Background of the invention

The invention of application No. 307,999 and application No. 629,332 is applicable to the evaluation of linear or angular displacements and obtains a linear electric signal as a function of the displacement over a wide range, which may extend from a micron to a centimetre or more, with exceptional sensitivity and resolution with a very short response time. It is adaptable, more particularly, to the study or measurement of static or dynamic deformations of material and to the examination of vibrations of machine parts.

It is briefly pointed out that according to patent applications 307,999 and 629,332 the displacement to be measured is communicated to the common plate of a double condenser. This latter is subjected to a high-frequency voltage which is well stabilised as regards amplitude and frequency; a double differential detection at the level of the secondary plates permits of obtaining a direct voltage algebraically proportional to the difference of the capacities caused by the displacement. In order to obtain a true linear response as a function of the displacement to be measured, it is thus sufficient for the capacities in question to vary, by construction, very linearly as a function of this latter, the marginal effects being capable in particular of being eliminated by the subtraction carried out.

Under these conditions, the linearity remains true for very large variations in the capacities and not for a small lack of equilibrium about a mean position.

It has also been set out in patent applications 307,999 and 629,332 by reference to FIGURES 4 and 5 thereof, how it is possible, by using matched lines, to permit only the double capacity at the level of the pick-up device, and this, as well as the advantage of a reduced size, permits of envisaging the use of the pick-up device in a region where, for example, the temperature conditions are very severe.

Nevertheless, in numerous cases of application, it may be advantageous to include the differential detection in the pick-up device. It is obviously possible to envisage the use of a line matched to the resonance in order to carry the high-frequency voltage at the pick-up device and to return the data signal by another coaxial cable.

However, this arrangement has several disadvantages, namely, the length imposed by the matched frequency of the connection, the use of two cables and the considerable dissipation in the resonant line.

Summary of the invention

The present invention has for its object improvements incorporated into the above arrangements of applications 307,999 and 629,332 consists wholly or in part of the following means:

(a) In a first embodiment:
(1) In using a single cable for carrying the high-frequency wave of constant amplitude and the data signal, by means of two separating filters, one at the inlet and the other at the outlet.
(2) In using an impedance-adapting transformer, which permits of establishing the frequency in use by approximately matching the secondary independently of the length of the connecting cable, which is then adapted to its iterative impedance.

(b) In a second embodiment, particularly adapted to obtaining high fidelity measurements:
(3) In using a reference voltage obtained from a stabilised voltage source in order to fix by chopping the amplitude from crest to crest of the high-frequency oscillation being used.
(2) Of forming in this latter case the chopper device by two diodes.

Brief description of the drawings

By way of example and in order to facilitate understanding of the present invention, reference is made to the accompanying drawings, in which.

Figure 1:
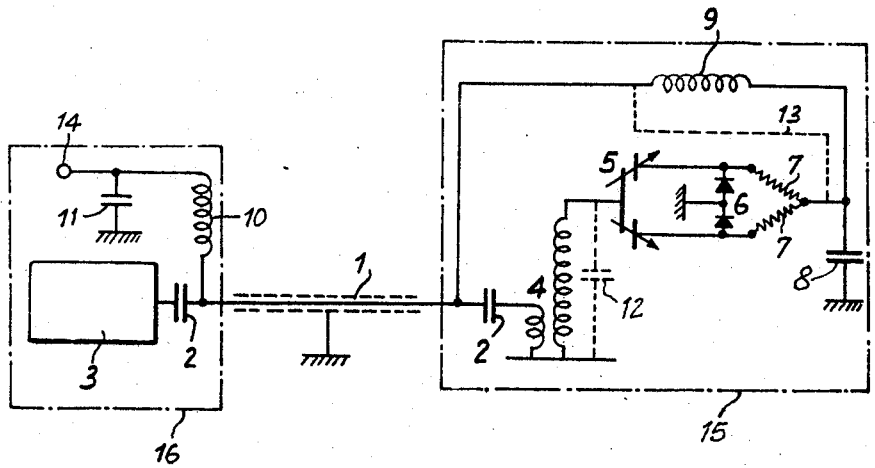
FIGURE 1 is a diagram showing a first embodiment of this arrangement mentioned above.

In the example of application as shown in FIGURE 1, it is possible, by contrast to the examples described in patent applications 307,999 and 629,332 to use only a single connecting cable of unspecified and unlimited length and to avoid a prohibitive dissipation for large connecting distances by conveying the high-frequency current at low voltage.

The single coaxial cable 1 connects the pick-up device 15 to its supply 16. The uncoupling condensers 2, of very low impedance for the high-frequency, and of very high impedance for the data signals of much lower frequency, enable it to be used for simultaneously carrying the high-frequency wave of constant amplitude delivered by the stabilised oscillator 3 and the data signal emitted from the pick-up device. The transformer 4, which may according to circumstances be made either with a ferrite core or without magnetic material, permits of bringing the high impedance presented by the pick-up device at the level of the common plate 5 to a value close to the iterative impedance of the cable 1. The high-frequency potential at the place 5 reaches its maximum value substantially at the matching frequency with the stray capacity 12 of the secondary of the transformer. It is this matching which in practice establishes the effective frequency of the apparatus almost independently of the length of the cable 1, which is then substantially adapted to its iterative impedance for a suitable ratio of transformation. By way of example, ratios to the value of 50 have been obtained with a good stability at frequencies from 3 to 15 mc./s., which can be conveyed over fairly large distances without prohibitive attenuation. The differential detector formed by the diodes 6, the resistances 7 and the condenser 8 supplies a continuous signal which is proportional to the measured displacement, which can be introduced into the connecting cable 1 by means of a choke coil 9 protecting the detection of the high-frequency current. This signal is taken off at the supply level by the same type of filter, formed by the inductance 10 and the condenser 11. The information can be taken at the terminal 14. It is to be pointed out that the elements 8 and 9 at the pick-up device are not absolutely essential and that the omission thereof, that is to say, a direct loop connecting the resistances 7 to the cable 1, as represented by the chain-dotted line 13, does not cause any substantital interference with the operation of the pick-up device and simplifies the construction of the latter.

Due to the high ratios made possible because of the adaptation of impedance effected by the transformer 4, it is possible, starting with an equal high-frequency power delivered by the oscillator 3, to obtain a very greatly increased sensitivity with respect to the earlier proposal of patent applications 307,999 and 629,332, while retaining the exceptional qualities of resolution and linearity of that invention. By way of example, the information voltage with a moderate high-frequency power of the order of 1 watt is able to sweep the area of ±5 volts on an output impedance of 5000 ohms, whatever the range of the apparatus, which may be from 100μ to 100 mm. or more. Such performances permit, for example, the direct use without amplification of a robust electromechanical apparatus, and this optionally for a small fraction of the range or travel.

The example which is next to be described has particular advantages, because of the fact that it maintains the fidelity of measurement, despite the possible variations in the behaviour of the oscillator, whereas in the precedingly described example, the gradient of the response curve is directly proportional to the output level of this latter and bound by its fluctuations. On the other hand, in the embodiment of FIGURE 1, the transformer for raising the voltage, disposed in the pick-up device 15, has its secondary circuit matched or tuned with the stray capacity with respect to the mass necessarily associated with the geometry and the construction of the pick-up device, possibly duplicated by an added capacity which permits the working frequency to be varied. The oscillating circuit has a natural frequency and an over-voltage factor capable of varying thermally and of thus creating supplementary errors in measurement by acting directly on the high-frequency potential imposed on the central plate of the differential condenser.

Figure 2:
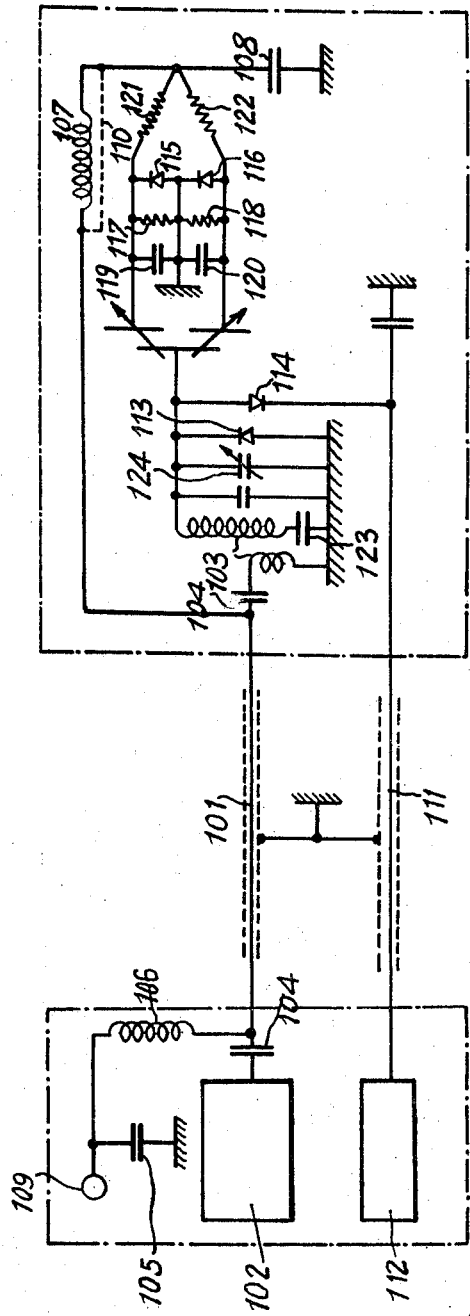
FIGURE 2 is a diagram of a second embodiment.

The embodiment shown in FIGURE 2 enables these causes of error to be overcome. Referring to this figure, it is seen that, in this case, the coaxial line 101, connecting the oscillator 102 to the transformer 103 which brings the input impedance of the pick-up device to its iterative impedance, always also serves to carry the continuous or low-frequency information signal supplied by the pick-up device, because of the uncoupling condensers 104 and the filters 105, 106 and 107, 108 disposed respectively in the supply and the pick-up device, so that the information is received at the terminal 109. It is pointed out that the filter 107, 108 may optionally be omitted without harming the quality of the measurement and replaced by the connection 110. The line 101 is duplicated by another coaxial line 111 transmitting to the pick-up device a reference voltage $V_0$ from a very well stabilised source 112. The diodes 113 and 114 permit of chopping the high-frequency signal imposed on the central plate at the potentials O and $V_0$, respectively, the lower end of the secondary of the transformer 103 being uncoupled by a large capacity 123 in order to permit the oscillation of the secondary circuit as thus modified to be symmetrical with respect to $V_0/2$. The double differential detection does in fact act as a differential integrating device and supplies a signal proportional to the difference of the quantities of electricity which appear at the secondary plates in each period. These quantities of electricity are essentially combined with the difference in potential, crest by crest, imposed on the central plate. The result of this is that, with frequency matching and a suitable chopping of the secondary oscillation, any relative variation in output level of the oscillator about its means operating value is shown by a deformation of the non-linear secondary oscillation obtained without variation of the crest to crest potential namely $V_0$, so that the relative variation undergone by the measuring signal, which in principle is zero from the foregoing reasoning, will in practice be of an order of magnitude distinctly lower than this variation of the output level of the oscillator. Furthermore, the variations of characteristics, as regards natural frequency and overvoltage of the secondary circuit because of thermal variations or ageing of the materials which are used, have only negligible repercussions on the measuring signal. As a result, the stability in practice of the slope of the response curve of the pick-up device is essentially connected with the stabilisation of the reference voltage $V_0$.

In the case where it is desired to have an extremely accurate apparatus, it seems that if this latter voltage $V_0$ is very well stabilized, the most important distributing factor causing variations in slope is the possible deviation in frequency rather than the variations in level of the oscillator, if this latter is controlled by an ordinary oscillating circuit, and hence there is then interest in preferably using an oscillator controlled by quartz. An adjustable capacitance 124 at the pick-up device then permits the working frequency of this latter to be adjusted to the frequency of the quartz.

Finally, the thermal variations of the detection diodes 115 and 116 may possibly be compensated for by the variations of resistances 117 and 118 arranged in parallel therewith, characterized by temperature co-efficients permitting them to compensate, by their variations, for those due to the diodes.

By acting on the values of the stray capacitors 119 and 120 and on those of the resistances 121 and 122, it is possible to obtain an excellent linearity, even with a high measuring signal which may correspond to high-frequency signals at the secondary plates which cannot be disregarded with respect to the potential $V_0$. Ranges of several tens of volts may be swept by the measuring signal without the linearity of the response being thereby affected.

It is to be pointed out that the two chopping diodes can be replaced by any other chopping arrangement of known type, without thereby departing from the scope of the present invention which is limited only the scope of the appended claims.

I claim:

1. Apparatus for measuring rectilinear and angular displacements and vibrations comprising, in combination two symmetrical, geometrically identical condensers arranged to have their respective capacity values varied linearly and equally, but in respective opposite directions, in accordance with the variations in the values to be measured; circuit means connecting one terminal of each condenser to a first common junction point; a source of high frequency A.C. potential having a first terminal connected to said first common junction point; two diodes each having a first electrode connected to the opposite terminal of a respective condenser, the second electrodes of said diodes, having polarities opposite to each other, being interconnected at a second junction point; second circuit means connecting said second junction point to the second terminal of said source of high frequency A.C. potential, whereby said diodes are connected in series opposition to each other relative to a continuously transmitted signal component of a detection circuit; two substantially voltage-independent equal value resistances each having a first end connected to a first electrode of a respective diode, the second ends of said resistance being interconnected at a third junction point constituting a first input terminal of a detection circuit; said detection circuit including a third condenser having a first terminal connected to said first input terminal and a second terminal connected to the second terminal of said source of high frequency A.C. potential; said first two resistances having values corresponding to the load and constituting means compensating non-linear variations inherent in the characteristics of the diodes; whereby said first two condensers work under a substantially constant potential difference so that the intensity of the respective signal furnished by each condenser is substantially proportional to the value of the condenser; said first two condensers being charged during a half cycle when the connected diode is conductive and discharged during the succeeding half cycle when the connected diode is blocked, and said first two condensers being charged and discharged in alternation; each of said first two condensers, during discharged thereof, charging said third condenser; said condensers, said diodes, and said resistances constituting components of a pick-up unit having a first common potential input and signal-output terminal constituting a second input terminal of said detection circuit; a supply and information unit having a second common potential-output and signal-input terminal; said source of high frequency potential constituting a component of said supply and information unit; means connecting said first terminal of said source to said second common potential-output and signal-input terminal; said signal detection circuit including means connecting said third junction point to said first common potential-input and signal-output terminal; a signal information terminal in said supply and information unit; first separating filter means connecting said information terminal to said second common terminal; second separating filter means in said pick-up unit connected between said first common junction point and said first common terminal; and a single coaxial cable interconnecting said first and second common potential-input and signal-output terminals and simultaneously transmitting high frequency potential from said source to said first common terminal and a signal potential from signal detection circuit to said information terminal.

2. Apparatus for measuring rectilinear and angular displacements and vibrations, as claimed in claim 1, including a source of stabilized reference voltage in said supply and information unit; a second coaxial cable connecting said source of stabilized voltage to said pick-up unit; and diode means in said pick-up unit connected to said second coaxial cable and to said first two condensers and establishing, by chopping, the amplitude from crest to crest of the high frequency potential.

3. Apparatus for measuring rectilinear and angular displacements and vibrations, as claimed in claim 2, in which said diode means comprises a pair of oppositely poled diodes.

4. Apparatus for measuring rectilinear and angular displacements and vibrations, as claimed in claim 5, including first and second uncoupling condensers, of very low impedance for high frequency potential and of very high impedance for the signal potential; said first uncoupling condenser being connected between said source of high frequency potential and said second common terminal and said second uncoupling condenser being connected between said first common terminal and said impedance-matching transformer.

5. Apparatus for measuring rectilinear and angular displacements and vibrations, as claimed in claim 1, including an impedance-matching transformation in said pick-up unit and connected between said first common terminal and said first junction point to apply said high frequency potential to said first two condensers; said impedance-matching transformer providing for the frequency used to be established by matching of the secondary winding thereof to the impedance of said first two condensers and independently of the length of said coaxial cable.

References Cited

UNITED STATES PATENTS

| 2,066,332 | 1/1937 | Caruthers | 179—15 X |
| 2,968,031 | 1/1961 | Higa. | |
| 3,012,192 | 12/1961 | Lion. | |

ROBERT SEGAL, *Primary Examiner.*

U.S. Cl. X.R.

340—186